United States Patent
Wang et al.

(10) Patent No.: US 12,154,366 B2
(45) Date of Patent: Nov. 26, 2024

(54) METHOD FOR REAL-TIME COUNTING OF PEDESTRIANS FOR STATISTICAL PURPOSES COUPLED WITH FACIAL RECOGNITION FUNCTION AND APPARATUS APPLYING METHOD

(71) Applicant: HON HAI PRECISION INDUSTRY CO., LTD., New Taipei (TW)

(72) Inventors: Wei-Chun Wang, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 360 days.

(21) Appl. No.: 17/537,987

(22) Filed: Nov. 30, 2021

(65) Prior Publication Data
US 2022/0189193 A1  Jun. 16, 2022

(30) Foreign Application Priority Data
Dec. 10, 2020  (CN) .......................... 202011455757.1

(51) Int. Cl.
*G06V 40/10*  (2022.01)
*G06N 3/08*  (2023.01)
(Continued)

(52) U.S. Cl.
CPC ............ *G06V 40/103* (2022.01); *G06N 3/08* (2013.01); *G06T 7/20* (2013.01); *G06T 7/70* (2017.01);
(Continued)

(58) Field of Classification Search
CPC . G06N 3/045; G06N 3/08; G06T 7/20; G06T 7/70; G06T 2207/10016;
(Continued)

(56) References Cited

U.S. PATENT DOCUMENTS 11,527,070 B2 * 12/2022 Srinivasan ................ G06T 7/20
2007/0276853 A1 * 11/2007 Hamza .............. G06F 16/90344
(Continued)

FOREIGN PATENT DOCUMENTS

| CN | 106156688 A | 11/2016 |
| CN | 109598211 A | 4/2019 |
| CN | 111738215 A | 10/2020 |

OTHER PUBLICATIONS

Cetinkaya et al. "People counting at campuses." Procedia-Social and Behavioral Sciences 182 (2015): 732-736. (Year: 2015).*

(Continued)

*Primary Examiner* — Katrina R Fujita
(74) *Attorney, Agent, or Firm* — ScienBiziP, P.C.

(57) ABSTRACT

A method for detecting and counting pedestrians in real-time for statistical purposes together with facial recognition of such pedestrians acquires video for analysis. Images showing pedestrians are extracted, such pedestrians being identified by a first detection model and pedestrian frames are outputted. A facial identification operation is executed based on the pedestrian frames and facial sub-frames are extracted. Removal of duplications of individual pedestrians in the images in the facial sub-frames is executed by a second detection model. Path of movement of detected pedestrians is tracked and labeled based on a specified algorithm when the faces of individual pedestrians are not recorded in a database. When the path of movement passes through a specified location, the face-imaged pedestrian is considered a target object, a total number of the target objects is counted. An apparatus applying the method is also disclosed.

16 Claims, 4 Drawing Sheets

(51) Int. Cl.
*G06T 7/20* (2017.01)
*G06T 7/70* (2017.01)
*G06V 20/40* (2022.01)
*G06V 40/16* (2022.01)

(52) U.S. Cl.
CPC ............ *G06V 20/46* (2022.01); *G06V 40/168* (2022.01); *G06V 40/172* (2022.01); *G06V 40/178* (2022.01); *G06T 2207/20081* (2013.01); *G06T 2207/20084* (2013.01); *G06T 2207/30201* (2013.01); *G06T 2207/30242* (2013.01); *G06V 2201/07* (2022.01)

(58) Field of Classification Search
CPC . G06T 2207/20081; G06T 2207/20084; G06T 2207/30201; G06T 2207/30242; G06V 20/46; G06V 40/103; G06V 40/168; G06V 40/172; G06V 40/178; G06V 2201/07
See application file for complete search history.

(56) References Cited

U.S. PATENT DOCUMENTS

| | | | | |
|---|---|---|---|---|
| 2014/0152763 | A1* | 6/2014 | Lim | G06V 20/53 348/36 |
| 2015/0278588 | A1* | 10/2015 | Matsumoto | G06Q 30/0201 382/103 |
| 2016/0379043 | A1* | 12/2016 | Fazl Ersi | G06V 40/172 382/118 |
| 2017/0098299 | A1* | 4/2017 | Liu | G06V 20/52 |
| 2020/0175693 | A1* | 6/2020 | Takada | G06V 10/50 |
| 2020/0349720 | A1* | 11/2020 | Che | G06V 20/53 |
| 2022/0036093 | A1* | 2/2022 | Kimura | G06T 7/11 |
| 2022/0172377 | A1* | 6/2022 | Gu | G06V 10/457 |
| 2022/0189297 | A1* | 6/2022 | Lin | G08G 1/056 |

OTHER PUBLICATIONS

Zhu et al. "People counting and pedestrian flow statistics based on convolutional neural network and recurrent neural network." 2018 33rd Youth academic annual conference of chinese association of automation (YAC). IEEE, 2018. (Year: 2018).*

Hsu et al. "Passenger flow counting in buses based on deep learning using surveillance video." Optik 202 (2020): 163675. (Year: 2020).*

Turchini et al. "Open Set Recognition for Unique Person Counting via Virtual Gates." Image Analysis and Processing—ICIAP 2019: 20th International Conference, Trento, Italy, Sep. 9-13, 2019, Proceedings, Part I 20. Springer International Publishing, 2019. (Year: 2019).*

* cited by examiner

METHOD FOR REAL-TIME COUNTING OF PEDESTRIANS FOR STATISTICAL PURPOSES COUPLED WITH FACIAL RECOGNITION FUNCTION AND APPARATUS APPLYING METHOD

FIELD

The subject matter herein generally relates to imaging, particularly face identification on real-time pedestrian statistics.

BACKGROUND

Face identification serves different functions for different purposes, such as for daily attendance records in a company, or as a password in a secure facility. Based on the face identification technology, a pedestrian flow in a street can be counted. However, in a crowd of pedestrians, bodies of different persons can be partly overlapped, and the number of the pedestrians that may be counted may be more because of recognizing one pedestrian multiple times, thus an accuracy of the count of pedestrians is reduced.

Thus, there is room for improvement in the art.

BRIEF DESCRIPTION OF THE FIGURES

Implementations of the present disclosure will now be described, by way of example only, with reference to the attached figures.

DETAILED DESCRIPTION

Figure 1:
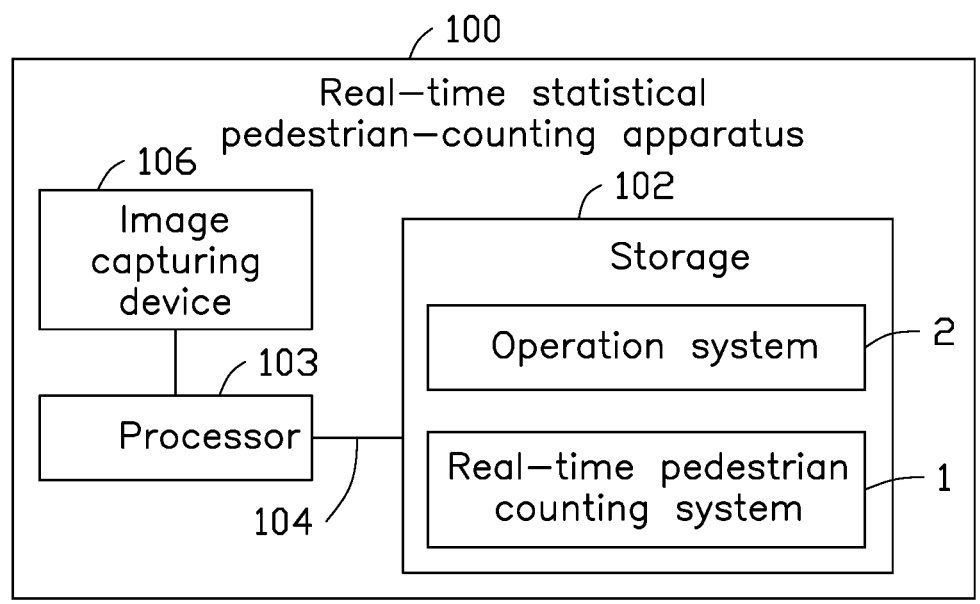
FIG. 1 is a diagram illustrating an embodiment of a real-time statistical pedestrian-counting apparatus; the real-time statistical pedestrian-counting apparatus comprising a real-time pedestrian counting system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

In general, the word "module," as used herein, refers to logic embodied in hardware or firmware, or to a collection of software instructions, written in a programming language, for example, Java, C, or assembly. One or more software instructions in the modules may be embedded in firmware, such as an EPROM, magnetic, or optical drives. It will be appreciated that modules may comprise connected logic units, such as gates and flip-flops, and may comprise programmable units, such as programmable gate arrays or processors, such as a CPU. The modules described herein may be implemented as either software and/or hardware modules and may be stored in any type of computer-readable medium or other computer storage systems. The term "comprising" means "including, but not necessarily limited to"; it specifically indicates open-ended inclusion or membership in a so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

The present disclosure provides an apparatus for counting and recognizing pedestrians in real-time for statistical purposes.

FIG. 1 shows a real-time statistical pedestrian-counting apparatus 100. The real-time statistical pedestrian-counting apparatus 100 includes a storage 102, a processor 103, a data bus 104, and at least one image capturing device 106. The real-time pedestrian statistics apparatus 100 can communicate with a server in a specified protocol. The specified protocol can include a Hyper Text Transfer Protocol (HTTP), a Hyper Text Transfer Protocol over Secure Socket Layer (HTTPs), not being limited. The server can be a single server, and can be a server group with servers having different functions. In one embodiment, the real-time pedestrian statistics apparatus 100 can be a movable terminal with a networking function, such a personal computer, a tablet, a smart phone, a personal digital assistant (PDA), a game machine, an interne protocol television (IPTV), a smart wearable device, or a navigator. The terminal device can be a fixed terminal with a networking function, such as a desktop computer or a digital television.

The real-time statistical pedestrian-counting apparatus 100 extracts images from a to-be-analyzed video. The real-time statistical pedestrian-counting apparatus 100 further identifies pedestrian in the images by a first detection model, and outputs pedestrian frames. The real-time statistical pedestrian-counting apparatus 100 can identify the faces in the pedestrian frames and outputs facial sub-frames. The real-time statistical pedestrian-counting apparatus 100 further executes a duplication-removal operation to the face images in the facial sub-frames by a second detection model, and tracks a moving path of a particular face in the image based on a specified algorithm when the particular image is not recorded in the database. The real-time statistical pedestrian-counting apparatus 100 further identifies target objects from the images when each object is moving through a specified location, and counts and outputs a total number of the target objects.

The storage 102 stores program codes. The storage 102 can be an embedded circuit having a storing function, such as a memory card, a trans-flash (TF) card, a smart media card, a secure digital card, and a flash card, and so on. The storage 102 exchanges data with the processor 103 through the data bus 104. The storage 102 stores an operation system 2 and a real-time pedestrian statistics system 1.

The operation system 2 manages and controls hardware and software programs. The operation system 2 further supports operations of the real-time pedestrian statistics system 1 and other software and programs.

Figure 2:
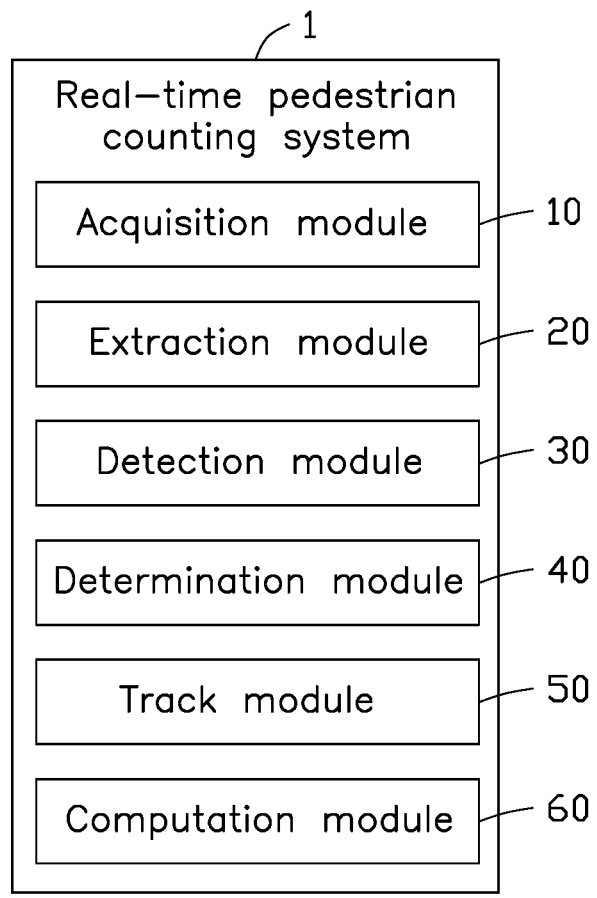
FIG. 2 is a diagram illustrating an embodiment of the real-time pedestrian counting system of FIG. 1.

The processor 103 can be a micro-processor or a digital processor. The processor 103 is used for running the program codes stored in the storage 102 to execute different functions. Modules illustrated in FIG. 2 are program codes stored in the storage 102 and are implemented by the processor 103 for executing a method for real-time pedestrian statistics. The processor 103 can be a central processing unit (CPU), or a large scale integrated circuit, being an operating core and a control core.

The data bus 104 exchanges data with the storage 102 and the processor 103.

The at least one image capturing device 106 can capture images and record video. In at least one embodiment, the image capturing device 106 can be set inside or beside the real-time statistical pedestrian-counting apparatus 100. The at least one image capturing device 106 can be rotated based on the control of the processor 103.

FIG. 2 shows the real-time pedestrian statistics system 1. The real-time pedestrian statistics system 1 includes a plurality of modules.

An acquisition module 10 acquires to-be-analyzed video.

In one embodiment, the to-be-analyzed video can be acquired by the at least one image capturing device 106, or can be acquired from the server. The to-be-analyzed video contains a plurality of image frames.

An extraction module 20 extracts images showing pedestrians in the to-be-analyzed video.

A detection module 30 identifies the pedestrian in the images by a first detection model and outputs pedestrian frames.

In one embodiment, the first detection model can be a deep learning pedestrian detection model based on YoloV3 algorithm.

The extraction module 20 further extracts facial sub-frames for face detection and recognition based on a facial identification operation applied to the pedestrian frames.

In one embodiment, the face identification operation is executed based on an open computer vision (OpenCV). Each facial sub-frame corresponding to one face.

The detection module 30 further executes a duplication-removal operation of duplicated faces in the facial sub-frames by a second detection model.

In one embodiment, the second detection model can be a convolutional neural network (CNN), such as a visual geometry group (VGG) network model. The second detection module VGG includes 16 layers of weighted layers, there are 13 convolution layers, 3 fully-connected layers, and 5 pooling layers. Each weighted layer includes a weighting value.

A determination module 40 determines whether a database includes the faces which are detected and recognized.

In one embodiment, the first detection model outputs pedestrian feature vectors as codes, and the determination module 40 searches in the database for such codes in determining whether relevant faces exist in the database.

A track module 50 labels the faces of pedestrians appearing in each facial sub-frame and tracks a path of a movement of a pedestrian based on the specified algorithm when an image of such face is not existing in the database.

In one embodiment, the specified algorithm can be a kernelized correlation filters (KCF).

The determination module 40 further determines whether the path of movement of the pedestrian passes through the specified location.

A computation module 60 extracts target objects from the facial sub-frames, which are projected to pass through the specified location, and computes a total number of the target objects.

The detection module 30 further detects facial features in the facial sub-frames by the third detection model.

The detection module 30 extracts facial features in the facial sub-frame, corrects an angle of the face in the facial sub-frame according to the facial features, and determines whether an area of the facial sub-frame is greater than a specified area. When the area of the facial sub-frame is greater than the specified area, the detection module 30 acquires a facial ambiguity based on a first function, and determines whether the degree of ambiguity in the face is greater than a threshold ambiguity. When the face ambiguity is greater than the threshold ambiguity, the detection module 30, by a third detection model, detects an age and a sex of the face appearing in the image.

In one embodiment, the facial features are five points landmarks using a Dlib library. The first function is a Laplacian operator function, and the third detection model is a VGG network model.

By applying the duplication-removal operation to the faces appearing in the images, erroneous determinations are reduced when images are captured of pedestrians who are overlapped or partly overlapped, and an accuracy of the pedestrian statistics is improved. By tracking path of movement and identifying facial features, ages and sex of the pedestrians can be recorded for further analysis.

Figure 3:
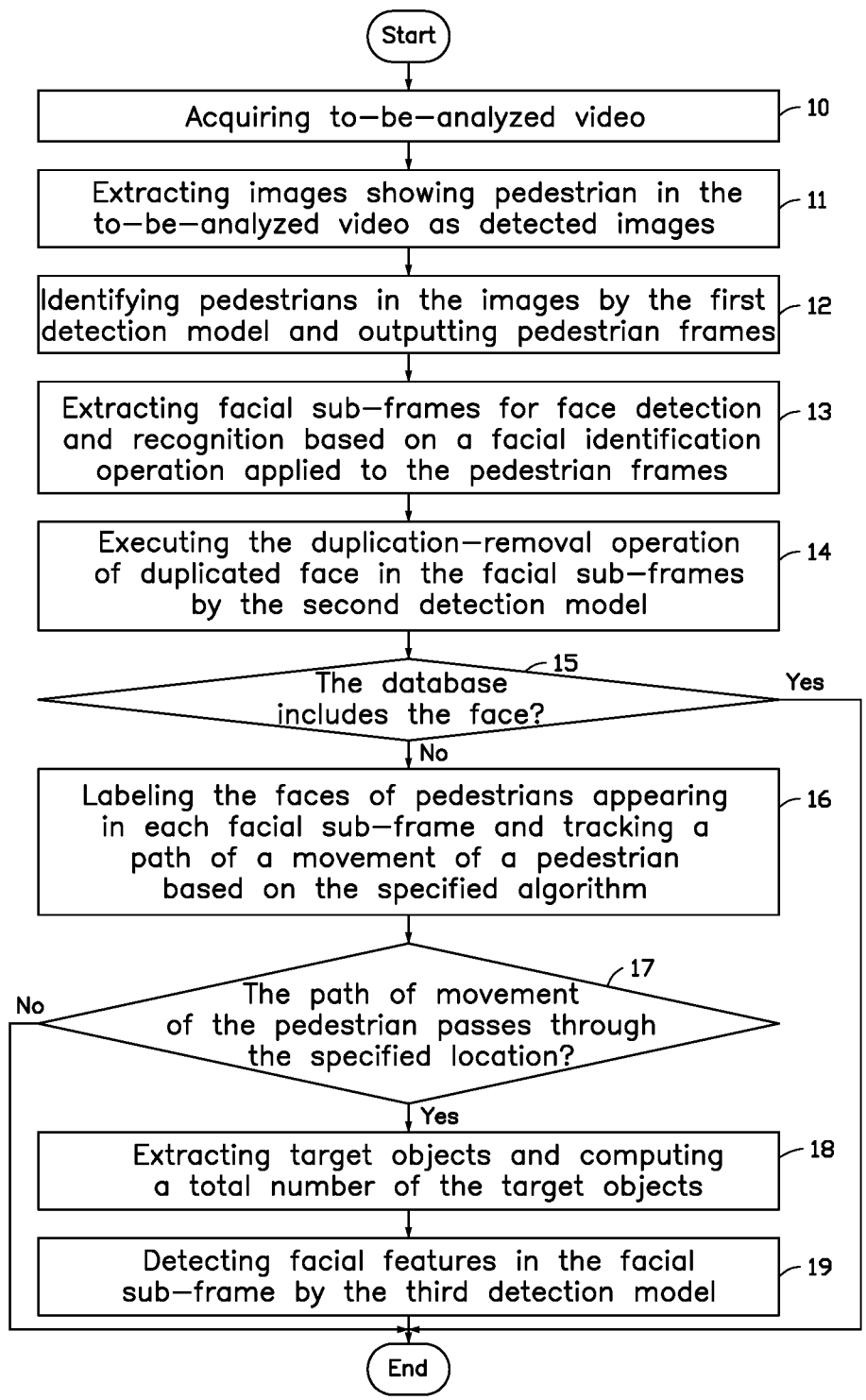
FIG. 3 is a flowchart illustrating an embodiment of method for counting pedestrians in real-time for statistical purposes.

FIG. 3 shows a flowchart of a method for detecting, identifying, and counting pedestrians in real-time for statistical purposes. In at least one embodiment, the method is used in the real-time pedestrian statistic system 1 of the real-time statistical pedestrian-counting apparatus 100. The real-time statistical pedestrian-counting apparatus 100 can include some or more hardware or software than in FIGS. 1 and 2, or the elements can be in a different location. The real-time statistical pedestrian-counting apparatus 100 can provide a visible interface. The visible interface provides an interface for user to communicate with the real-time statistical pedestrian-counting apparatus 100. The user can use mobile phone or computer to connect with the real-time statistical pedestrian-counting apparatus 100.

The real-time statistical pedestrian-counting apparatus 100 processes the program codes in the storage 102 by the processor 103 to execute the acquisition module 10, the extraction module 20, the detection module 30, the determination module 40, the track module 50, and the computation module 60, and communicates with the at least one image capturing device 106 to implement the method for real-time pedestrian statistic.

The method may comprise at least the following steps, which also may be re-ordered:

In block 10, the acquisition module 10 acquires to-be-analyzed video.

In one embodiment, the to-be-analyzed video can be acquired by the at least one image capturing device 106, or can be acquired form the server. The to-be-analyzed video contains a plurality frames of the images.

In block 11, the extracting module 20 extracts images showing the pedestrian as the images in the to-be-analyzed video.

In block 12, the detection module 30 identifies the pedestrian in the images by a first detection model and outputs pedestrian frames.

In one embodiment, the first detection model can be a deep learning pedestrian detection model based on YoloV3 algorithm.

In block 13, the extraction module 20 further extracts facial sub-frames for face detection and recognition based on a face identification operation applied to the pedestrian frames.

In one embodiment, the face identification operation is executed based on an Open computer vision (OpenCV).

In block 14, the detection module 30 further executes a duplication-removal operation of duplicated face in facial sub-frames by a second detection model.

In one embodiment, the second detection model can be a convolutional neural network (CNN), such as a visual geometry group (VGG) network model. The second detection model VGG includes 16 layers of weighted layers, there are 13 convolution layers, 3 fully-connected layers, and 5 pooling layers. Each weighted layer includes a weighting value.

In block 15, the determination module 40 determines whether a database includes the face.

In one embodiment, the first detection model outputs pedestrian feature vectors as codes, and the determination module 40 searches in the database for such codes in determining whether relevant faces exist in the database.

When the database includes the face, the procedure ends.

In block 16, the track module 50 labels the face of pedestrians appearing in each facial sub-frame and tracks a path of movement of a pedestrian based on the specified algorithm when an image of such face is not existing in the database.

In one embodiment, the specified algorithm can be a kernelized correlation filters (KCF).

In block 17, the determination module 40 further determines that whether the path of the movement of a pedestrian passes through the specified location.

When the path of the movement of a pedestrian does not pass through the specified location, the procedure ends.

In block 18, the computation module 60 extracts target objects from the facial sub-frames, which are projected to pass through the specified location, and computes a total number of the target objects.

In block 19, the detection module 30 further detects facial features in the facial sub-frame by a third detection model.

Figure 4:
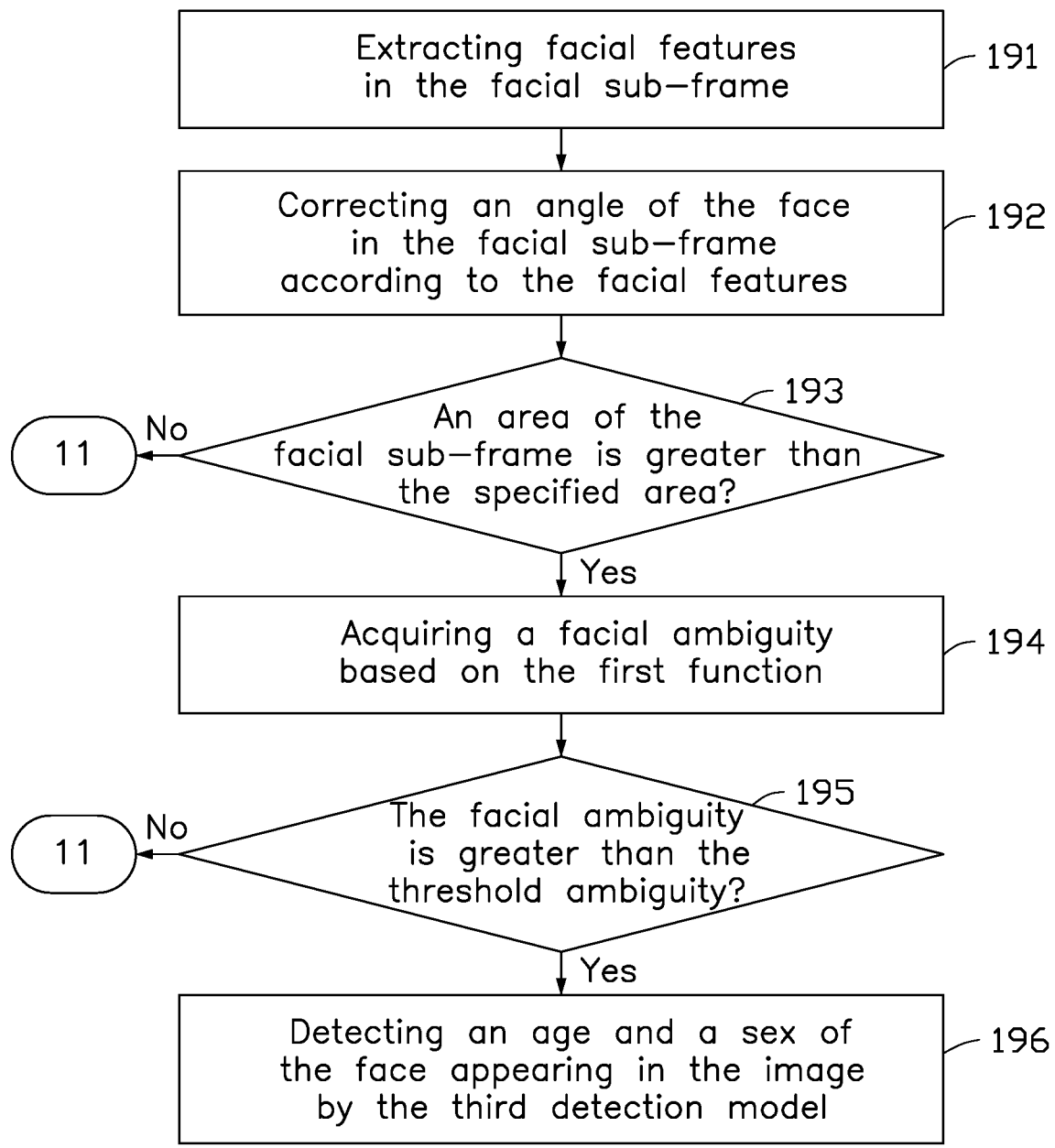
FIG. 4 is a detailed flowchart illustrating an embodiment of block 19 in the method of FIG. 3.

FIG. 4 illustrates a detail flowchart of the block 19. The block 19 further includes the following steps.

In block 191, the detection module 30 further detects facial features in the facial sub-frame by the third detection model.

In one embodiment, the facial features are five points landmarks using a Dlib library.

In block 192, the detection module 30 extracts facial features in the facial sub-frame, corrects an angle of the face in the facial sub-frame according to the facial features.

In block 193, the detection module 30 determines whether an area of the facial sub-frame is greater than a specified area.

When the area of the facial sub-frame is less than or equal to the specified area, the procedure goes to block 11.

In block 194, the detection module 30 acquires a facial ambiguity based on a first function.

In the embodiment, the first function is a Laplacian operator function, and the third detection model is a VGG network model.

In block 195, the detection module 30 determines whether the facial ambiguity is greater than a threshold ambiguity.

When the face ambiguity is less than or equal to the threshold ambiguity, the procedure goes to block 11.

In block 196, the detection module 30 detects an age and a sex of the face appearing in the image by the third detection model.

Based on the method for real-time pedestrian statistic, by extracting the deduplication operation of the face images, the erroneous judgement is reduced when the pedestrians being overlapped or partly overlapped, and an accuracy of the pedestrian statistics is improved. By tracking moving path and identifying face feature, ages and sex of the pedestrian can be counted to further analysis.

While various and preferred embodiments have been described the disclosure is not limited thereto. On the contrary, various modifications and similar arrangements (as would be apparent to those skilled in the art) are also intended to be covered. Therefore, the scope of the appended claims should be accorded the broadest interpretation so as to encompass all such modifications and similar arrangements.

What is claimed is:

1. A method in a real-time pedestrian statistic apparatus; the real-time pedestrian statistic apparatus comprises a processor and a storage with at least one command;
    the at least one command is implemented by the processor to execute the following steps:
    acquiring to-be-analyzed video;
    extracting images showing pedestrian in the to-be-analyzed video as images;
    identifying pedestrians in the images by a first detection model and outputting pedestrian frames;
    extracting facial sub-frames based on a face identification operation applied to the pedestrian frames;
    executing a duplication-removal operation of duplicated faces in the facial sub-frames by a second detection model;
    determining whether a database comprises a face of each detected pedestrian;
    labeling the face of pedestrians appearing in each facial sub-frame and tracking a path of a movement of a pedestrian based on a specified algorithm when the database does not comprise the face;
    determining whether the path of the movement of the pedestrian passes through a specified location; and
    when the path of the movement of the pedestrian passes through the specified location, extracting target object, which are projected to pass through the specified location, and computing a total number of the target objects;
    wherein the method further comprises:
    detecting facial features in the facial sub-frame by a third detection model;
    wherein the step of detecting facial features in the facial sub-frame by the third detection model further comprises:
    extracting facial features in the facial sub-frame;
    correcting an angle of the face in the facial sub-frame according to the facial features;
    determining whether an area of the facial sub-frame is greater than a specified area;
    when the area of the facial sub-frame is greater than the specified area, acquiring a facial ambiguity based on a first function;
    determining whether the facial ambiguity is greater than a threshold ambiguity; and
    when the facial ambiguity is greater than the threshold ambiguity, detecting an age and a sex of the face appearing in the image by the third detection model.

2. The method of claim 1, wherein the first detection model is a deep learning pedestrian detection model based on YoloV3 algorithm.

3. The method of claim 1, wherein the facial identification operation is executed based on an open computer vision.

4. The method of claim 1, wherein the second detection model is a visual geometry group network model.

5. The method of claim 1, wherein the specified algorithm is a kernelized correlation filters.

6. The method of claim 1, wherein the first function is a Laplacian operator function.

7. The method of claim 1, wherein the third detection model is a visual geometry group network model.

8. The method of claim 1, wherein the first detection model outputs pedestrian feature vectors as codes, and the codes are searched in the database for determining whether relevant faces exist in the database.

9. A real-time statistical pedestrian-counting apparatus comprises a processor and a storage; the processor executes program codes stored in the storage; the storage comprises:
- an acquisition module, configured to acquire to-be-analyzed video;
- an extraction module, configured to extract images showing the pedestrian as the images in the to-be-analyzed video, and extract facial sub-frames based on a face identification operation;
- a detection module, configured to identify the pedestrian in the images by a first detection model, and execute a duplication-removal operation of the face in the facial sub-frames by a second detection model;
- a determining module, configured to determines whether a database comprises a face of each detected pedestrian, and determines whether a path of a movement of the pedestrian passes through a specified location;
- a track module, configured to label the face of pedestrians appearing in each facial sub-frame, and configured to track the path of the movement of the pedestrian based on a specified algorithm when the database does not comprise the face; and
- a computation module, configured to extract target objects, which are projected to pass through a specified location, and configured to compute a total number of target objects;

wherein the detection module further detects facial features in the facial sub-frame by a third detection model; wherein the detection module further extracts facial features in the facial sub-frame, and corrects an angle of the face in the facial sub-frame according to the facial features; the detection module further determines whether an area of the facial sub-frame is greater than a specified area; when the area of the facial sub-frame is greater than the specified area, the detection module acquires a facial ambiguity based on a first function; the detection module further determines whether the facial ambiguity is greater than a threshold ambiguity; when the facial ambiguity is greater than the threshold ambiguity, the detection module detects an age and a sex of the face appearing in the image by a third detection model.

10. The real-time statistical pedestrian-counting apparatus of claim 9, wherein the first detection model is a deep learning pedestrian detection model based on YoloV3 algorithm.

11. The real-time pedestrian statistic apparatus of claim 9, wherein the facial identification operation is executed based on an open computer vision.

12. The real-time statistical pedestrian-counting apparatus of claim 9, wherein the second detection model is a visual geometry group network model.

13. The real-time statistical pedestrian-counting apparatus of claim 9, wherein the specified algorithm is a kernelized correlation filters.

14. The real-time statistical pedestrian-counting apparatus of claim 9, wherein the first function is a Laplacian operator function.

15. The real-time statistical pedestrian-counting apparatus of claim 9, wherein the third detection model is a visual geometry group network model.

16. The real-time statistical pedestrian-counting apparatus of claim 9, wherein the first detection model outputs pedestrian feature vectors as codes, and the determination module searches in the database for the codes in determining whether relevant faces exist in the database.

* * * * *